July 27, 1926.
F. P. MIES
CREAM SEPARATOR
Filed Sept. 8, 1925
1,593,839
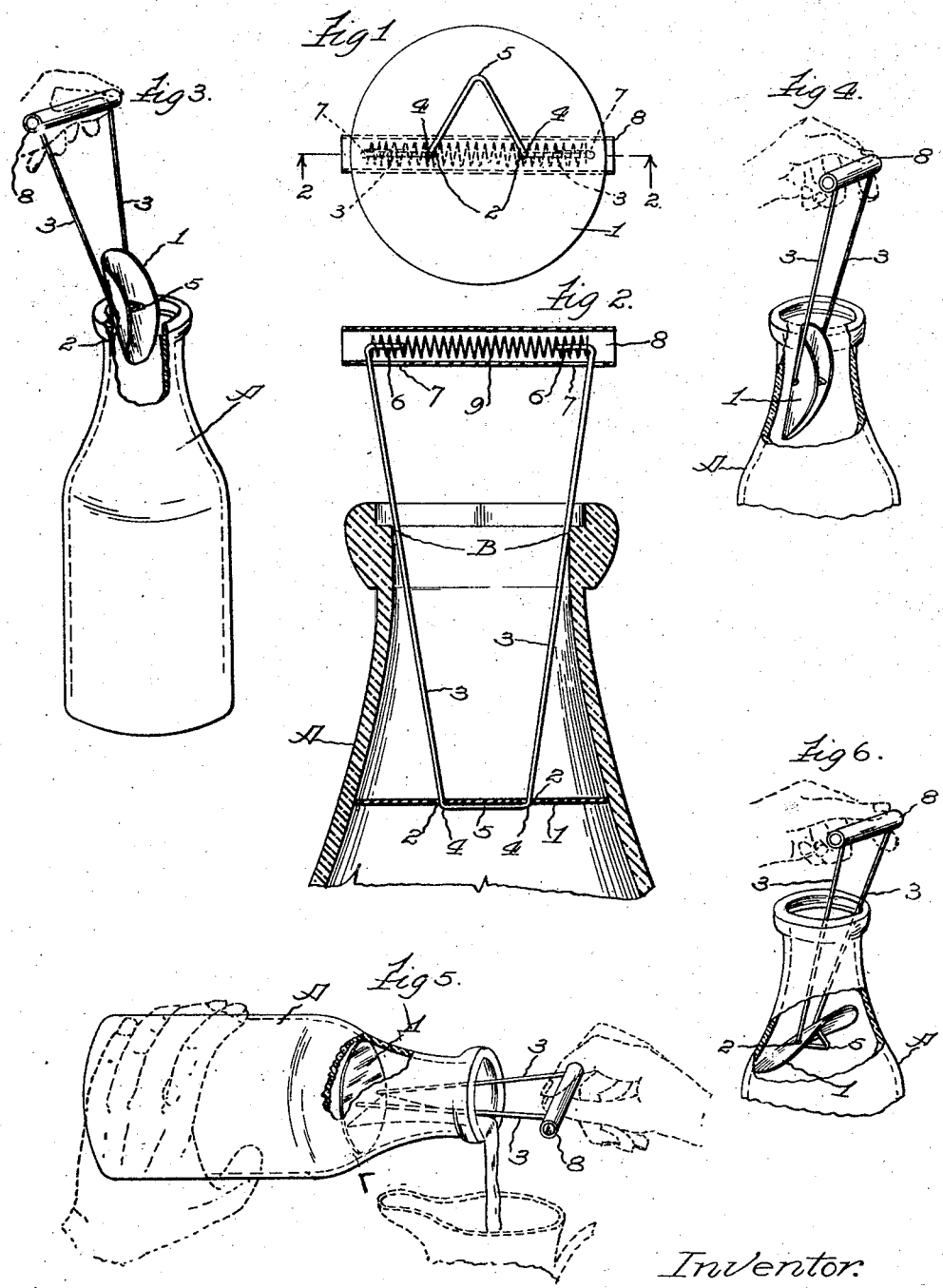
Witness
H. M. Knight
Inventor:
Frank P. Mies.
by Burton & Burton
his Attorneys.

Patented July 27, 1926.

1,593,839

UNITED STATES PATENT OFFICE.

FRANK P. MIES, OF CHICAGO, ILLINOIS.

CREAM SEPARATOR.

Application filed September 8, 1925. Serial No. 54,880.

The purpose of this invention is to provide a simple, economical and readily cleanable device adapted for insertion in a standard commercial form of milk bottle to serve as a dam or partition for separating the cream in the upper portion of the bottle from the milk, so that the cream may be poured off for use independently of the milk. It consists of certain features and elements of construction in combination as herein shown and as indicated by the claims.

In the drawings:

Figure 1 is a bottom plan view of the device embodying this invention.

Figure 2 is an elevation partly in section showing the device in the position of use in the neck of the milk bottle, section being taken substantially as indicated at line 2—2 on Figure 1.

Figure 3 is a perspective view with a portion of the bottle broken away to show the mode of insertion of the device.

Figure 4 is a view showing the device further inserted in the neck of the bottle.

Figure 5 is a perspective view showing the invention in use and the cream being poured off from the bottle.

Figure 6 is a perspective view with a portion of the bottle wall broken away showing the manner of removal of the device.

As is well understood, in the commercial milk bottle as delivered to the customer the required cream content is frequently added to the milk at the time the bottle is filled, or, if it is thoroughly mixed with the milk, the cream separates in the course of a few hours and rises to the upper portion of the bottle occupying the tapering neck thereof. Many customers prefer to use this cream separately, and various methods have been devised for removing it from the bottle without seriously disturbing the liquid contents and thus diluting the cream with the milk.

For this purpose the present invention provides a flexible disk, 1, for which a relatively thin brass has been found quite suitable. This disk is normally flat but may be bent almost double, as shown in Figures 3 and 4, without assuming any permanent distortion. The disk is formed with a pair of apertures 2, 2 through which the longer portions 3, 3 of the wire handle are inserted. Just below the disk the wires 3, 3 are bent at 4, 4 and from these bends converge to form a V-shaped stop whose apex at 5 is preferably an integral junction of the wires. The V-shaped stop extends in a plane substantially at right angles to the upwardly diverging portions 3, 3 of the handle, and the extreme ends of these parts are bent toward each other at 6, 6 as shown in Figure 2. These bent end portions are inserted through slots 7, 7 of a tubular handle, 8, where they are engaged with the ends of a coiled spring, 9, which operates to urge them apart yieldingly, thus tending to increase the angle of divergence of the portions 3, 3.

To insert the device in the neck of the bottle, A, the disk, 1, is first rocked upon its fulcrum apertures, 2, 2 so that it lies against the wires 3, 3 and then by pressing the disk against the curved inner edge B, of the bottle mouth it may be sufficiently flexed for insertion, as shown in Figures 3 and 4. As the disk moves downwardly through the widening neck of the bottle, A, its elasticity causes it to unfold as rapidly as the width of the bottle neck will permit, so that as it reaches the portion whose diameter is substantially equal to that of the disk, it assumes its normal flat shape extending transversely across the bottle neck. A slight upward pull on the cross bar, 8, will then seat the edge of the disk against the walls of the bottle. However, the divergent form of the wires 3, 3 requires them to be wedged against the curved edge, B, of the bottle mouth as the device is inserted, and their own resilience coupled with the expansive stress of the spring, 9, tends to force the device upwardly in the bottle neck so that the disk, 1, will be seated independently of manual assistance.

When the disk is thus seated, the bottle may be tilted as shown in Figure 5, and the cream poured off into a separate receptacle. If desired, the disk may be held snugly in position by pulling upon the cross bar, 8, with one hand, but ordinarily this is quite unnecessary by reason of the yielding stress exerted in an outward direction by the divergent wires 3, 3, as already explained.

When the cream has been removed, it becomes necessary to flex the disk, 1, again in order to remove it through the narrow neck of the bottle. This is readily done, however, by swinging the wires 3, 3 against the edge, B, of the bottle mouth at the side toward which the apex, 5, of the V-shaped stop wire projects. This presses the opposite edge of the disk, 1, against the sloping bottle neck, causing it to ride downwardly against the slope, thus tilting the disk upon the fulcrum bends 4, 4 of the wire and pressing its edge upwardly in the bottle neck. Then by a pull upon the cross bar, 8, the disk may be drawn up through the neck, being flexed sufficiently to pass through the narrowest portion, which is usually at the mouth of the bottle, and then resuming its normal flat shape as it emerges from the bottle mouth.

I find that by properly shaping the wire, the fulcrum bends at 4, 4 may be made to bear outward frictionally against the edges of the apertures 2, 2 when the device is removed from the bottle. Then upon insertion of the device, the wires 3, 3 are pressed toward each other slightly as they engage the bottle mouth at B, and this relieves the friction of the wires at the apertures 2, 2, leaving the disk, 1, free to swing into transverse position against the V-shaped stop wires as soon as it reaches the proper point in the bottle neck.

This friction again comes into play when the device is removed and serves for retaining the disk in the vertical position shown in Figure 3, while it is inserted in the bottle.

I also find that by making the fulcrum connection between the disk and the wire handle in the extremely simple form shown, in which the apertures 2, 2 serve for engagement with the wire, the device is easy to keep clean and sanitary, having no outstanding lugs or projections to catch or hold foreign matter.

I claim:

1. In combination, a flexible normally flat disk having a pair of apertures and a wire handle inserted through said apertures and bent transversely to provide stop portions engaging the under face of the disk adjacent its apertures.

2. In combination, a flexible normally flat disk having a pair of apertures and a wire handle inserted through said apertures comprising two portions bent transversely to provide stops engaging the under face of the disk, said portions extending divergently from the upper side of the disk, and being adapted to yield to vary the angle of divergence.

3. In combination, a flexible normally flat disk having a pair of apertures and a wire handle pivotally engaged with the disk by insertion of its wires through said apertures, said wires being bent transversely to form a stop engaging the under face of the disk, and a cross bar connecting the wires at their opposite ends at a distance above the disk.

4. In combination, a handle comprising a wire bent at the middle of its length to form a short V-shaped portion with longer portions bent at right angles to the plane of the V, a flexible normally flat disk having a pair of apertures through which said longer portions are inserted and at which the disk is fulcrumed on the right angle bend of the wire.

5. In the combination defined in claim 4 means yieldingly connecting said longer portions at a distance from the disk permitting their angle of divergence to be varied.

6. In the combination defined in claim 4 a tubular cross bar slotted at one side to receive the ends of said longer portions of the wire, and yielding means within said tubular bar reacting between said ends of the wire for spreading them.

7. In the combination defined in claim 1, said wire handle including two portions extending divergently from the upper face of the disk, and a hollow cross bar slotted at one side to receive the upper ends of said wires, together with a spring engaging the wires within the cross bar tending to spread them.

8. In combination, a flexible normally flat disk having a pair of apertures and a wire handle inserted through said aperture with stop portions bent transversely away from the line joining said apertures and engaging the under face of the disk, said stop portions extending in non-parallel relation to each other and the other parts of the handle extending in non-parallel relation from the upper face of the disk, whereby the disk is fulcrumed on the wire by engagement with its apertures at the bends and retained at such fulcrumed points by the non-parallelism of the wires.

FRANK P. MIES.